3,044,961
METAL SALTS OF BRIDGED PHENOLS AND
LOW MOLECULAR WEIGHT ACIDS
Arnold J. Morway, Clark, John C. Munday, Cranford, Jeffrey H. Bartlett, New Providence, and Clifford W. Muessig, Roselle, N.J., assignors to Esso Research and Engineering Company, a corporation of Delaware
No Drawing. Filed Apr. 1, 1959, Ser. No. 803,363
12 Claims. (Cl. 252—37.2)

This invention relates to compositions comprising the metal salts of bridged phenols and low molecular weight acids, to oil solutions and dispersions of said compositions, and to methods for their preparation.

The principal utility for the compositions of this invention is their use in mineral and synthetic lubricating oils as an extreme pressure anti-wear additive in concentrations between 0.2 and 20 percent by weight, and as a thickener, extreme pressure and anti-wear additive for greases when used in concentrations between 10 and 40 percent by weight.

The compositions of this invention may be prepared by co-neutralizing a mixture of bridged phenol and low molecular weight acid with a metal base, or by reacting the metal base with the acid to form a salt and then heating said salt with the bridged phenol until dehydrated. The molar ratio of acid to bridged phenol will be in the range of 0.02 to 50, preferably in the range of 5 to 40.

The bridged phenols of this invention are aromatic compounds having two phenolic groups connected by a common substituent atom. The common substituent atom, or bridging atom is selected from the class of elements comprising carbon, sulfur, nitrogen and silicon. Preferably the bridging atom is selected from the class of carbon and sulfur. The bridging atom will have two of its valences satisfied by carbon atoms (i.e. satisfied by a carbon atom from each of the two benzene rings, which rings also contain an acidic or phenolic hydroxyl radical). Valences in excess of two in the common bridging atom may be satisfied by hydrogen, carbon, oxygen or halogen atoms.

The bridged phenols for use in accordance with this invention may be represented by the following formula:

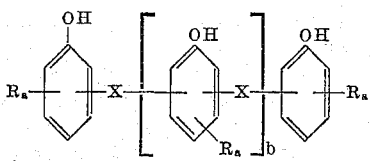

wherein R is a monovalent substituent selected from the group of halogen atoms and hydrocarbon groups having from 1 to 30 carbon atoms, $a$ is a digit from 0 to 2, $b$ is an integer from 0 to 10 and X is a bridging group in which the bridging atom is selected from the group consisting of carbon, sulfur, nitrogen and silicon. Preferably, the bridging atom is selected from the class of carbon and sulfur and has two valences satisfied by the substitution of hydrogen in the adjacent benzene rings of a pair of phenolic groups as represented by the formula.

An example wherein X has carbon as the common atom is

or methylene. X may be a divalent alkylidene group having from 1 to 16 carbon atoms, for example methylene, ethylidene, 2,2-propylidene, 1,1-octylidene, etc. R may represent an alkyl group having from 1 to 30 carbon atoms, for example methyl, amyl, iso-octyl, etc., or a halogen, for example chlorine. Specific examples of compounds thus represented by the formula are:

Bis(4-hydroxyphenyl) methane
2,2-bis(4-hydroxyphenyl) propane
Bis(4-hydroxyphenyl) methane
Bis(2-hydroxy-5-nonylphenyl) methane
Bis(2-hydroxy-5-octylphenyl) octane
2,2-bis(3-chloro-4-hydroxyphenyl) propane When the bridging group X has sulfur as the common atom, the divalent linkage may be sulfide (—S—), sulfoxide (—SO—) or sulfone (—SO$_2$—).

Specific examples of phenolic compounds with a bridging sulfur atom include bis(4-hydroxyphenyl) sulfide, bis(2-hydroxy-5-nonylphenyl) sulfoxide and bis(4-hydroxytolyl) sulfone. In addition to such pure compounds mixed alkyl phenol sulfides and sulfoxides and sulfones derived from them are included within the scope of this invention. The alkyl phenol sulfides are mixtures thought to contain in addition to simple sulfides, a substantial portion of molecules having more than two phenol groups which are interconnected or bridged by sulfur atoms. They may be produced by treating alkyl phenols with sulfur dichloride according to the teachings of U.S. 2,362,289–93 and by other methods familiar to those skilled in the art. These alkyl phenol sulfides are preferred among the sulfur bridged phenols of this invention. Specific examples of these preferred materials include nonyl phenol sulfide, cresol sulfide, xylenol sulfide, t-amylphenol sulfide and dodecyl phenol sulfide. The metal salts of alkyl phenol sulfides containing between 0.85 to 0.95 mole of sulfur per mole of alkyl phenol are highly soluble in oil and extremely useful in forming the additive material of this invention for use in liquid lubricants and greases.

The acid will be a low molecular weight monocarboxylic acid having about two carbon atoms per molecule. The preferred acid for use in accordance with the present invention is acetic acid. Substituted acetic acids may also be used. These substituted acetic acids include glycolic acid or hydroxy-acetic acid, thioglycolic acid or mercapto-acetic acid, monochloro-acetic acid, dichloro-acetic acid, trichloro-acetic acid and the corresponding bromo and fluoro acetic acids and mixtures of these acids with and without acetic acid.

Mixtures of acetic acid with other organic and inorganic acids in less than equimolar proportions of the latter may also be used. The other organic acids include oxalic acid, propionic acid, acrylic acid, and benzene, toluene and xylene sulfonic acids. The inorganic acids include carbonic, hydrochloric, nitric, sulfuric and phosphoric acids.

The generic formula for the acetic and substituted acetic acids to be used in accordance with the present invention is as follows: $Y_n \cdot CH_{3-n} \cdot COOH$ wherein $n$ is a digit from 0 to 3 inclusive and $Y$ is a monovalent substituent selected from the group consisting of hydroxyl (—OH), mercapto (—SH) and halogens such as (—Cl), (—F) or (—Br). When $Y$ is —OH or —SH, $n$ must equal 1.

Any of the polyvalent metals, e.g. di- and tri-valent metals, in the form of their metal bases can be used in preparing the compositions of this invention. Examples of the metals which may be used are: calcium, barium, chromium, cadmium, nickel, iron, cobalt, zinc and aluminum. The alkaline earth metals and particularly calcium are preferred. The metals in the form of their metal hydroxides will normally be used, however metal bases such as calcium oxide, magnesia or baryta can be employed. The bases are used to provide metal salts by reaction with the above acidic ingredients of the composition of this invention. The polyvalent metal bases may be used individually and they may be used in mixtures with one another. When a calcium base is used, oxides or hydroxides of other polyvalent metals such as zinc, iron or alminum may be used with it.

In general, the composition of the present invention is prepared by neutralizing a mixture of a bridged phenol and an acid as hereinbefore defined with a polyvalent metal base followed by heating until the product is dehydrated. The composition can also be prepared by reacting the acid with the base prior to mixing with the bridged phenol and then heating to remove water or excess free low molecular weight acid. Generally, but not necessarily, the reaction is carried out in an oil medium. Carrying out the reaction in an oil medium is especially useful in making concentrate lubricating oil additives and greases.

In grease manufacture dehydration is carried out at a temperature in the range of about 250° to 600° F., e.g., 300° to 450° F. Dehydration time will depend on temperature and batch size and hence is widely variable, however, the time will generally range from 15 minutes to 12 hours, e.g., about ½ hour to 6 hours. A preferred embodiment of this invention is to prepare concentrate lubricating oil additives and greases by dissolving the bridged phenol in 5 to 40 molar proportions of the acid, as hereinbefore defined, and then add this solution to a thoroughly mixed quantity of oil and metal base, followed by heating to temperatures between 300 to 350° F. If small quantities, in the range of 0.5 to 5.0 weight percent, of high molecular weight fatty acids are to be added, somewhat higher temperatures, e.g., 400 to 500° F. may advantageously be employed. The composition is next allowed to cool to about 180° to 200° F. where conventional additives, if desired, can be added. Homogenization may then be effected by passing through a Gaulin homogenizer or Morehouse mill with subsequent cooling to room temperature.

When the composition is prepared in an oil menstruum, the oil can be either a mineral or synthetic oil having a viscosity at 100° F. in the range of 60 to 3000 Saybolt Seconds Universal. Mineral oils having a viscosity at 100° F. in the range of 100 to 1200 SSU are particularly preferred. Synthetic lubricating oils which may be used are those, well known in the lubricating art, that are not attacked by acetic acid at temperatures below 212° F.

The composition of the invention may be used as a petroleum additive in the presence of various other additives. For example, material such as calcium petroleum sulfonate and alkaline earth and alkali metal soaps of $C_{12}$ to $C_{30}$ fatty acids; oxidation inhibitors such as phenyl α-naphthylamine; viscosity index improvers such as polyisobutylene; pour depressants; dyes; other fatty acid soaps; grease thickeners; etc. Some of these additives, such as sulfonates, fatty acid soaps, polyglycols, etc., can profitably be present during the preparation of the additive to also serve as dispersing agents.

The invention will be further understood by the following examples which include the preferred embodiments of the invention. The first five examples show the preparation of the compositions of this invention in an oil medium so as to form greases and concentrate lubricating oil additives. In these five examples the salts are formed from acetic acid and: C-bridged phenols (Example I), S-bridged phenols (Example II), C-bridged alkylated phenols (Example III), S-bridged alkylated phenols (Example IV) and C-bridged halogenated phenols (Example V). Example VI shows the preparation of the metal salts of this invention in the absence of the oil medium.

EXAMPLE I

*Compositions Prepared From the Co-Neutralized Metal Salts of Carbon Bridged Phenols and Acetic Acid*

An excellent extreme pressure, high temperature grease composition, grease A, was prepared as follows: 76.0 weight percent of mineral oil, having a viscosity at 210° F. of 55 SSU and a V.I. of 40, was added to a fire heated grease kettle and mixed intimately with 8.0 weight percent of hydrated lime. Then 5 weight percent of 2,2-bis(4-hydroxyphenyl) propane, which has the following structural formula:

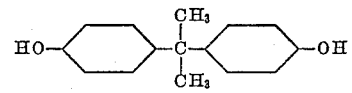

was dissolved in 10 weight percent of glacial acetic acid at 140° F. and added to the kettle. Heating was continued to 440° F. at which point the heat was shut off and the composition allowed to cool to 220° F. where 1.0 weight percent of phenyl α-naphthylamine was added as an anti-oxidant. The grease composition was then passed through a Morehouse mill at 0.003″ clearance.

The second formulation, grease B, was prepared according to the procedure outlined above, except that this formulation was only heated to a maximum temperature of 300° F.

Grease C was prepared according to the same procedure as grease A, except with 1,1-bis(4-hydroxyphenyl) isooctane, in which the bridging group was isoheptyl methane instead of dimethyl methane. Also, the temperature used in the preparation of grease C was never raised above 300–320° F.

The isoheptyl methane bridged bis phenol ($C_8$ Oxo bis phenol) was prepared by condensing 742 grams (5.8 moles) of a $C_8$ Oxo aldehyde (prepared by oxonation of propylene-butylene copolymer) with 2265 grams (23 moles) phenol in the presence of 150 grams of Dowex 50X–8 ion exchange resin and 500 cc. of hexane and refluxing at a temperature of 120° C. After removal of hexane over a steam bath, the crude product was distilled and a main cut of 888 g. was collected at temperatures between 175° C. and 220 C., and 0.3 m.m. to 0.5 mm. Hg.

Three additional grease compositions designated greases D, E and F were prepared according to the procedures of greases A and C, except that minor amounts of high molecular weight fatty acids (12-hydroxystearic acid and Hydrofol Acid 51 a commercial mixture of fatty acids equivalent to stearic acid) were added to the mixture of hydrated lime and mineral oil. The maximum temperatures for the formulation of these greases were approximately 400° to 450° F.

The formulation in terms of weight percent of ingredients and the properties of greases A through F are given in Table I.

TABLE I

| | Greases | | | | | |
|---|---|---|---|---|---|---|
| | A | B | C | D | E | F |
| Formulation, Wt. percent: | | | | | | |
| Glacial Acetic Acid | 10 | 10 | 12 | 10 | 15 | 10 |
| 2,2-Bis(4-hydroxyphenyl) propane | 5 | 5 | | 1.5 | 1.5 | |
| 1,1-Bis(4-hydroxyphenyl) isooctane [1] | | | 6 | | | 1.5 |
| Hydrated Lime | 8 | 8 | 9 | 7.5 | 11 | 7.5 |
| Hydrofol Acid 51 | | | | 1.5 | 1.0 | |
| 12-Hydroxystearic Acid | | | | | | 1.5 |
| Phenyl α-Naphthylamine | 1 | 1 | 1 | | | |
| Mineral Oil, 55 SSU at 210° F | 76 | 76 | 72 | 79.5 | 71.5 | 79.5 |
| Maximum Temperature ° F | 440 | 300 | 320 | 400 | 400 | 400 |
| Mol Ratio Acid/Bridged Phenol | 7.6 | 7.6 | 10 | 25 | 38 | 33 |
| Properties: | | | | | | |
| 4-Ball Wear Test Scar Dia. mm. (1,800 r.p.m., 75° C.—1 Hr. 10 kg. Load) | 0.32 | 0.28 | | 0.32 | 0.32 | 0.28 |
| Dropping Point ° F | 500+ | 500+ | 500+ | 500+ | 500+ | 500+ |
| Penetration 77° F. mm./10: | | | | | | |
| Unworked | 310 | 321 | 315 | 283 | 315 | 298 |
| Worked 60 Strokes | 325 | 339 | 336 | 296 | 314 | 325 |
| Worked 10,000 Strokes | 372 | 375 | 369 | 314 | 344 | 348 |
| Almen Test (Weights Carried Excellent Pin Condition): | | | | | | |
| Gradual Loading 15 wts. max | 15 | 15 | 15 | 15 | 15 | 15 |
| Shock Loading 15 wts. max | 15 | 15 | 15 | 15 | 15 | 15 |
| Norma Hoffman Oxidation Test Hrs. to a 5 p.s.i. Drop | 390 | 385 | 365 | | | |
| Lubrication Life Hrs., 10,000 r.p.m. at 250° F | | 2,400 | 2,180 | 1,900 | 2,400 | |
| Water Solubility (Boiling Water) | (2) | (2) | (2) | (2) | (2) | (2) |

[1] Mixture of isomers.
[2] Insoluble.

EXAMPLE II

*Compositions Prepared From the Co-Neutralized Metal Salts of Sulfur-Bridged Phenols and Acetic Acid*

The grease compositions of Table II illustrate the preparation of greases containing the mixed salts of this invention.

A novel grease composition, grease A, is prepared according to the procedure of Example IA, except that 5.4 weight percent of bis(2-hydroxy-5-methylphenyl) sulfide is substituted for the 5 weight percent of 2,2-bis(4-hydroxyphenyl) propane.

For grease B, the above formulation is repeated except that the lower temperatures in the range of 300–320° F. are used in the preparation of this formulation.

Grease C is prepared according to the procedure of Example IA except that 7.3 weight percent of bis(2-hydroxy-5-butylphenyl) sulfide (prepared by reacting butyl phenol with sulfur dichloride) is substituted for the 5 weight percent of 2,2-bis(4-hydroxyphenyl) propane, and the formulation is only heated to a maximum temperature of 320° F.

Grease D is prepared with the bis(2-hydroxy-5-butylphenyl) sulfide of grease C above, however, 1.5 weight percent of hydroxystearic acid is added to the mixture and grease D is prepared with heating to a maximum temperature of 440° F.

Table II gives the formulation in terms of weight percent of ingredients.

TABLE II

| | Greases | | | |
|---|---|---|---|---|
| | A | B | C | D |
| Formulation, Weight Percent: | | | | |
| Glacial Acetic Acid | 10.0 | 10.0 | 10.0 | 10.0 |
| Bis(2-hydroxy-5-methylphenyl) sulfide | 5.0 | 5.0 | | |
| Bis(2-hydroxy-5-butylphenyl) sulfide | | | 7.3 | 1.8 |
| Hydrated Lime | 8.0 | 8.0 | 8.0 | 7.5 |
| Phenyl α-Naphthylamine | 1.0 | 1.0 | 1.0 | |
| Hydrofol Acid 51 | | | | 1.5 |
| Mineral Oil (55 SUS at 210° F.) | 76.1 | 76.6 | 73.7 | 79.2 |
| Maximum Temperature, ° F | 440 | 320 | 320 | 440 |
| Mol Ratio Acid/Bridged bisphenol | 8/1 | 8/1 | 8/1 | 50/1 |

EXAMPLE III

*Compositions Prepared From the Co-Neutralized Metal Salts of C-Bridged Alkylated Phenols and Acetic Acid*

Carbon bridged alkylated phenols were prepared by condensing a $C_7$ aldehyde with para cresol, ortho cresol, xylenol and a mixture of petroleum cresols known as Pitt Con #1 Cresol having the following weight percent composition:

| | Wt. percent |
|---|---|
| Meta cresol | 50–52 |
| Para cresol | 18–20 |
| Ortho cresol | 2–3 |
| Xylenol | 25–30 |

These carbon bridged alkylated phenols were formed by condensing the cresols, xylenols and mixtures thereof with a $C_7$ aldehyde in the presence of an ion exchange resin catalyst at temperatures of approximately 190–230° C. and 0.3 mg. Hg.

Five grease compositions, greases A through E of Table III, were prepared by intimately mixing lime, mineral oil and hydroxy stearic acid in a steam heated grease kettle. To this mixture was added while stirring a blend of acetic acid and the above carbon-bridged alkylated phenols. Mixing is continued until the heat of reaction subsides. Steam is then passed into the kettle jacket and the temperature raised to 320° F. The temperature is held at 320° F. for 30 minutes and the grease is cooled to 200° F. Phenyl α-naphthylamine is added and the grease cooled further to 150° F. where it is homogenized at between 5000 and 7000 p.s.i.

The formulations and properties of greases A through E are given in Table III.

TABLE III

| | Greases | | | | |
|---|---|---|---|---|---|
| | A | B | C | D | E |
| Formulation, Wt. percent: | | | | | |
| Glacial Acetic Acid | 15.0 | 15.0 | 15.0 | 15.0 | 15.0 |
| Hydroxystearic Acid | 2.0 | 2.0 | 2.0 | 2.0 | 2.0 |
| 1,1-Bis(methyl hydroxyphenyl) heptane [1] | 2.0 | 2.0 | | | |
| 1,1-Bis(2-hydroxy-5-methylphenyl) heptane | | | 2.0 | | |
| 1,1-Bis(hydroxy methylphenyl) heptane | | | | 2.0 | |
| 1,1-Bis(hydroxy dimethylphenyl) heptane | | | | | 2 |
| Hydrated Lime | 10.7 | 10.9 | 10.7 | 10.7 | 10.9 |
| Phenyl α-Naphthylamine | 1.0 | 1.0 | 1.0 | 1.0 | 1.0 |
| Mineral Oil (55 SSU at 210° F.) | 69.3 | | 69.3 | 69.3 | |
| Mineral Oil (80 SSU at 210° F.) | | 69.1 | | | 69.1 |
| Maximum Temp., ° F | (3) | (3) | (3) | (3) | (3) |
| Properties: | | | | | |
| Appearance | (4) | (4) | (4) | (4) | (4) |
| Dropping Point ° F | 500+ | 500+ | 500+ | 500+ | 500+ |
| Penetration 77° F. mm/10: | | | | | |

Footnotes at end of table.

TABLE III—Continued

| Properties—Continued. | Greases | | | | |
|---|---|---|---|---|---|
| | A | B | C | D | E |
| Unworked | 311 | 308 | 295 | 325 | 308 |
| Worked 60 Strokes | 324 | 311 | 296 | 332 | 312 |
| Worked 10,000 Strokes | 317 | 324 | 347 | 360 | 333 |
| Wheel Bearing Test 220° F | Pass | Pass | Pass | Pass | Pass |
| Timken Test 43 Lbs. Load | Pass | Pass | Pass | Pass | Pass |
| 4-Ball Wear Test Scar Dia. mm.(1,800 r.p.m., 75° C.—1 Hr. 10 kg. Load | | 0.31 | 0.33 | 0.34 | 0.31 |
| Lubrication Life Hours 10,000 r.p.m. at 250° F.² | 2,000+ | 2,000+ | 2,000+ | 2,000+ | 2,000+ |

1 Derived from mixed cresols.
2 Discontinued after 2000 hrs.
3 320 Steam Kettle.
4 Excellent.

Grease compositions of the metal salts of carbon bridged alkylated phenols and acetic acid are also prepared as follows: 79.1 parts by weight of mineral oil (55 SSU at 210° F.) are intimately mixed with 7.5 percent by weight of hydrated lime and charged to a fire heated grease kettle. To this mixture is then added a mixture comprising 3.4 percent by weight of a bisphenol such as 1,1-bis(4-hydroxy-5-nonylphenyl) isooctane, 2,2-bis(2-hydroxy-5-dodecylphenyl) propane, etc. prepared by condensing an aliphatic aldehyde with two or more moles of an alkyl phenol and 10 percent by weight of glacial acetic acid. The heat is then raised to 300° F. to 450° F. at which temperature the heat is shut off and the batch is allowed to cool to 200° F. The batch is then Gaulin homogenized at between 5000 and 7000 p.s.i.

The above compositions are excellent, smooth, uniform greases which may be further blended with mineral or synthetic lubricating oils to form liquid lubricants having exceptionally high extreme pressure anti-wear properties. As examples of finished lubricating oil blends: (1) 20 weight percent of grease A is blended with 80 weight percent of a mineral lubricating oil having a viscosity of 150 SSU at 100° F. and a V.I. of 104; and (2) 40 weight percent of grease B is blended with 60 weight percent of di(2-ethylhexyl) sebacate.

EXAMPLE IV

*Compositions Prepared From the Co-Neutralized Metal Salts of S-Bridged Alkylated Phenols and Acetic Acid*

Table IV gives the formulation and properties of four additional compositions of the present invention. In these compositions, A, B, C and D, the bridged phenol was in the form of an oil solution containing 60 weight percent of nonyl phenol sulfide with a 0.9 molar ratio of sulfur to nonyl phenol. This bridged phenol was prepared by first alkylating phenol with trimer of propylene and then bridging by means of sulfur dichloride as taught in U.S. 2,362,289–93. The base was hydrated lime and the acid was glacial acetic acid.

In the preparation of A, B, C and D, the lime was dispersed in mineral oil; the bridged phenol was added next with stirring; then the acid was added with continued stirring and the mixture was heated to form the compositions of this invention. A was heated to 450° F. B, C and D were heated to 350° F. In B, the acetic acid was mixed with about 10% of a mixture of 24% caprylic, 56% capric and 20% lauric acids. In C and D, the acetic acid was mixed with a mineral oil solution containing 30 weight percent of calcium petroleum sulfonate having about 950 molecular weight. A, B, C and D, prepared as described and having the ingredients shown under (a) in Table IV, were homogenized to yield smooth, viscous products, which were dispersions of calcium compounds and which had sulfated ash contents as shown under (b).

Blends of A, B and C were made in oil K as shown under (c) in Table IV. Oil K was a light mineral oil having 150 SSU viscosity at 100° F. and 104 viscosity index. The results given under (c) show that compositions A, B and C increased the viscosity and the viscosity index of oil K and imparted to it a load carrying capacity of 15 weights, the maximum attainable in the standard Almen test, which is well known in the lubricating art.

Blends of B, C and D were made in oil L as shown under (d) in Table IV. Oil L was a phenol-refined mineral oil from coastal crude petroleum. Its viscosity was 80 SSU at 210° F. and 1200 SSU at 100° F. It contained 2.11% zinc dibutyl dithiocarbamate as an oxidation inhibitor. The results given under (d) show that compositions B, C and D imparted very good anti-wear properties to oil L, inasmuch as the wear scar diameter in the standard 4-ball test, which is well known in the lubricating art, was only 0.3 mm.

Table IV accordingly shows the utility of the compositions of this invention as additives in concentrations between 2 and 8 percent by weight in lubricating oil, with and without other additives, for improving viscosity index, load-carrying and anti-wear properties. The molar ratio of acetic acid to bridged phenol was 15.7 in A, B and C and 0.9 in D.

TABLE IV

| | A | B | C | D |
|---|---|---|---|---|
| (a) Ingredient, Wt. Percent: | | | | |
| Acetic Acid | 10.0 | 20.0 | 20.0 | 2.4 |
| Nonyl phenol sulfide solution | 8.3 | 16.7 | 16.7 | 33.3 |
| Mixed C₈ to C₁₂ carboxylic acids | | 2.0 | | |
| Ca petroleum sulfonate solution | | | 12.0 | 7.0 |
| Ca hydroxide | 7.5 | 14.9 | 14.4 | 2.0 |
| Mineral Oil (55 SSU at 210° F.) | 74.2 | 46.4 | 36.9 | 55.3 |
| Total | 100.00 | 100.0 | 100.0 | 100.0 |
| (b) Percent Sulfated Ash | 12.0 | 24.8 | 25.9 | 3.2 |
| (c) Blends in Oil K: | | | | |
| Wt. Percent Oil K | 60 | 80 | 80 | |
| Wt. Percent Additive | 40 | 20 | 20 | |
| Wt. Percent Additive (Active ingredient)¹ | 9.0 | 9.0 | 8.9 | |
| Vis. at 100° F., SSU | 459 | 220 | 184 | |
| Vis. at 210° F., SSU | 49.6 | 51.6 | 57.7 | |
| Viscosity Index | | 131 | 165 | |
| Almen load test, wts | 15 | 15 | 15 | |
| (d) Blends in Oil L: | | | | |
| Wt. Percent Oil L | | 90 | 90 | 90 |
| Wt. Percent Additive | | 10 | 10 | 10 |
| Wt. Percent Additive (Active ingredient)¹ | | 4.5 | 4.5 | 2.4 |
| Vis. at 100° F., SSU | | 1,169 | 1,267 | 1,124 |
| Vis. at 210° F., SSU | | 83.7 | 98.9 | 79.8 |
| Viscosity Index | | 65 | 93 | 93 |
| Almen load test, wts | | 15 | 7 | 6 |
| 4-ball wear test, mm. (1,800 r.p.m. 75° C—1 Hr. 10 kg. Load) | | 0.3 | 0.3 | 0.3 |

1 Product of reaction of acetic acid, nonyl phenol sulfide and Ca.

To further illustrate the use of S-bridged alkylated phenols other compositions may be prepared as follows:

Example IV(A) is repeated, but using di(2-ethylhexyl) sebacate in place of oil K and an oil solution containing 60 weight percent bis(tertiary amyl hydroxyphenyl) sulfide in place of the oil solution of nonyl phenol sulfide.

Example IV(B) is repeated but using 8.3 parts by weight of a mineral lubricating oil solution containing 60 weight percent of an alkyl phenol sulfide of the formula:

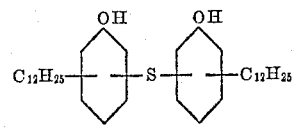

Example IV shows the preparation of compositions comprising the calcium salts of sulfur-bridged alkylated phenols and acetic acid in mineral and synthetic oil bases in concentrations of about 5 to 40 weight percent of the mineral oil solvent. The mole ratios of acetic acid to bridged phenol vary from about 16/1 in compositions A, B and C to about 1/1 in composition D.

EXAMPLE V

*Compositions Prepared From the Co-Neutralized Metal Salts of Halogenated Carbon-Bridged Phenols and Acetic Acid*

Three novel grease formulations, greases A through C, were prepared according to the procedure of Example IA, except that a chlorinated bis phenol having the following structural formula:

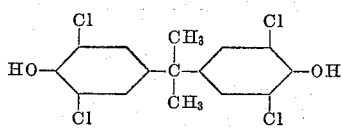

2,2-bis(4-hydroxy-3,5-dichlorophenyl) propane was substituted for the p,p'-dihydroxy-diphenyl-dimethyl-methane. Greases A and C were prepared at maximum temperatures of 320° F. while grease B was prepared at a maximum temperature of 400° F.

Table V shows the formulation and properties of greases A through C.

TABLE V

|  | Greases | | |
|---|---|---|---|
|  | A | B | C |
| Formulation Wt. Percent: | | | |
| Glacial Acetic Acid | 15.0 | 15.0 | 11.25 |
| Tetrachlorobisphenol | 4.0 | 2.0 | 1.50 |
| Hydroxystearic Acid | | 2.0 | 1.50 |
| Hydrated Lime | 10.3 | 11.0 | 8.25 |
| Phenyl α-Naphthylamine | 1.0 | 1.0 | 1.00 |
| Mineral oil, 55 SSU at 210° F | 69.7 | 69.0 | 76.50 |
| Mol Ratio: | | | |
| Acetic to tetrachlorobisphenol | 23/1 | 46.1/1 | 46.1/1 |
| Acetic to Hydroxystearic acid | | 37.5/1 | 37.5/1 |
| Hydroxystearic Acid to tetrachlorobisphenol | | 1.22/1 | 1.22/1 |
| Maximum Temp. ° F | 320 | 400 | 320 |
| Properties: | | | |
| Dropping Point, ° F | 500+ | 500+ | 500+ |
| Penetration 77° F. mm./10: | | | |
| Unworked | 360 | 250 | 363 |
| Worked 60 Strokes | 370 | 255 | 360 |
| Worked 10,000 Strokes | 345 | 275 | 360 |
| 4-Ball Wear Test Scar Diam. mm. (1,800 r.p.m. 75° C—1 Hr.—10 kg. Load) | 0.30 | 0.25 | 0.29 |
| Timken Test 43 lbs. Load | | Pass | Pass |
| Almen Test (Wts. carried Excellent Pin Condition): | | | |
| Gradual Loading 15 wgts. Max | | 15 | 15 |
| Shock Loading 15 wgts. Max | | 15 | 15 |
| Lubrication Life, Hours [1] (10,000 r.p.m. at 250° F.) | | 2,000+ | 2,000+ |
| Water Washing Test Percent Loss | | 0.0 | 0.0 |
| Water Solubility (Boiling Water) | ([2]) | ([2]) | ([2]) |

[1] Discontinued after 2,000 hours.
[2] Insoluble.

EXAMPLE VI

The following formulations were prepared to illustrate the preparation of the compositions of this invention in the absence of an oil medium and at relatively high molar proportions of the bridged phenol per molar proportion of acetate.

(A) A solution of 10.0 g. (0.018 mol) of dodecylphenol sulfide prepared according to the method described in Example IV and 0.37 g. (0.0015 mol) of chromic acetate in 200 ml. of absolute ethanol was heated on a steam bath at temperatures between 180° F. and 300° F. until all the alcohol was removed. A clear, dark reddish-green viscous product was obtained which contained 0.78 wt. percent chromium.

(B) A mixture of 10.0 g. (0.018 mol) of dodecylphenol sulfide and 0.37 g. (0.0015 mol) of chromic acetate was stirred on a steam bath for 12 hours during which time the mixture gradually became clear. A dark reddish-green viscous product was obtained which obtained 0.72 wt. percent chromium.

(C) Other compositions containing from 0.19% to 9.0% chromium were prepared in similar manner by employing the constituents in the reaction mixture in mol ratios ranging from about 0.67 to about 48 mols of dodecyl phenol per mol of chromic acetate.

The compositions of this invention may also be prepared by substituting any of the following polyvalent metals for the chromium of paragraphs A, B, and C above; barium, calcium, magnesium, cadmium, nickel, iron, cobalt, zinc and aluminum.

The above examples are merely illustrative of the certain species within the concept of this invention.

What is claimed is:

1. Polyvalent metal salts of a bridged phenol and acetic acid, wherein said bridged phenol has the formula:

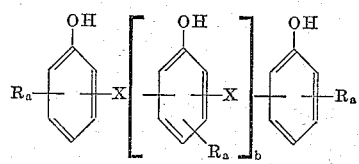

where R is a monovalent substituent selected from the group consisting of halogen atoms and hydrocarbon groups having from 1 to 30 carbon atoms, $a$ is a digit from 0 to 2, $b$ is an integer from 0 to 10, and X is a divalent bridging group selected from the group consisting of alkylidene groups having 1 to 16 carbon atoms and sulfur, wherein the molar ratio of said acetic acid to said bridged phenol is in the range of 0.02 to 50, wherein said salts are formed by reacting said bridged phenol with a member selected from the group consisting of (1) metal base and acetic acid and (2) metal salt of acetic acid; and then dehydrating.

2. The composition according to claim 1 wherein the molar ratio of said acid to said bridged phenol is in the range of 5 to 40.

3. The composition according to claim 1, wherein X is sulfur.

4. The composition according to claim 1, wherein X is a $C_1$ to $C_{16}$ alkylidene group.

5. The composition according to claim 1, wherein R is halogen.

6. The composition according to claim 1, wherein R is an alkyl group having 1 to 30 carbon atoms.

7. The composition according to claim 1, wherein said polyvalent metal is an alkaline earth metal.

8. A polyvalent metal salt composition consisting essentially of salts of a bridged phenol and acetic acid, wherein said bridged phenol has the formula:

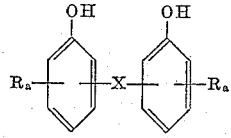

wherein R is chlorine, X is sulfur, $a$ is two, the molar ratio of said acetic acid to said bridged phenol being about 5:1 to 40:1, said salt having been prepared by coneutralizing said bridged phenol and said acetic acid with alkaline earth metal base, followed by dehydrating at temperatures of about 300° to 450° F.

9. A polyvalent metal salt composition consisting essentially of salts of a bridged phenol and acetic acid, wherein said bridged phenol has the formula:

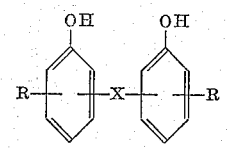

wherein R is a $C_1$ to $C_{30}$ alkyl group and X is sulfur, the molar ratio of said acetic acid to said bridged phenol being about 5:1 to 40:1, said composition having been prepared by coneutralizing said bridged phenol and said acetic acid with alkaline earth metal base followed by dehydrating at temperatures of about 300° to 450° F.

10. A method of preparing a mixed salt product consisting essentially of metal salts of acetic acid and a bridged phenol of the formula

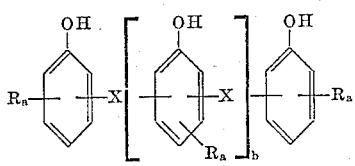

where R is a monovalent substituent selected from the group consisting of halogen atoms and hydrocarbon groups having from 1 to 30 carbon atoms, $a$ is a digit from 0 to 2, $b$ is an integer of 0 to 10, and X is a divalent bridging group selected from the group consisting of alkylidene groups having 1 to 16 carbon atoms and sulfur, which comprises mixing said 0.02 to 50 molar proportions of said acid per molar proportion of said phenol with a polyvalent metal base, and heating to dehydrate the mixture.

11. A method of preparing a mixed salt product consisting essentially of salts of acetic acid and a bridged phenol of the formula

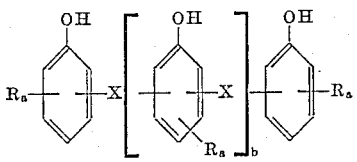

where R is a monovalent substituent selected from the group consisting of halogen atoms and hydrocarbon groups having from 1 to 30 carbon atoms, $a$ is a digit from 0 to 2, $b$ is an integer of 0 to 10, and X is a divalent bridging group selected from the group consisting of alkylidene groups having 1 to 16 carbon atoms and sulfur, which comprises mixing a polyvalent metal salt of said acid with said phenol, and heating to dehydrate, wherein the molar ratio of said acid to said phenol is 0.02:1 to 50:1.

12. The method according to claim 11, wherein said bridged phenol is dodecylphenol sulfide and said salt of said acetic acid is chromium acetate.

References Cited in the file of this patent

UNITED STATES PATENTS

| | | |
|---|---|---|
| 2,197,835 | Reiff | Apr. 23, 1940 |
| 2,376,313 | Reiff | May 15, 1945 |
| 2,731,418 | Howell et al. | Jan. 17, 1956 |
| 2,808,377 | Davidson et al. | Oct. 1, 1957 |
| 2,835,688 | Le Suer | May 20, 1958 |
| 2,921,904 | Hotten | Jan. 19, 1960 |